(12) United States Patent
Hirono et al.

(10) Patent No.: US 12,094,500 B2
(45) Date of Patent: Sep. 17, 2024

(54) HARD DISK DRIVE CARRIAGE ARM DEPRESSION

(71) Applicant: Western Digital Technologies, Inc., San Jose, CA (US)

(72) Inventors: Yoshiyuki Hirono, Chigasaki (JP); Andre Chan, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/222,953

(22) Filed: Jul. 17, 2023

(65) Prior Publication Data
US 2024/0144967 A1 May 2, 2024

Related U.S. Application Data

(60) Provisional application No. 63/421,399, filed on Nov. 1, 2022.

(51) Int. Cl.
*G11B 5/48* (2006.01)
(52) U.S. Cl.
CPC .................................. *G11B 5/4813* (2013.01)
(58) Field of Classification Search
None
See application file for complete search history.

(56) References Cited

U.S. PATENT DOCUMENTS

| | | | | |
|---|---|---|---|---|
| 5,801,905 A * | 9/1998 | Schirle | ............... | G11B 5/4833 360/265.9 |
| 5,812,342 A * | 9/1998 | Khan | ............... | G11B 5/4833 360/244.9 |
| 5,905,608 A * | 5/1999 | Frees | ............... | G11B 5/5521 360/265.9 |
| 5,936,808 A * | 8/1999 | Huang | ............... | G11B 5/4833 360/265.9 |
| 6,091,574 A * | 7/2000 | Misso | ............... | G11B 5/4833 |
| 6,245,265 B1 * | 6/2001 | Chung | ............... | B29C 33/52 264/250 |

(Continued)

FOREIGN PATENT DOCUMENTS

| | | | | |
|---|---|---|---|---|
| KR | 100385325 B1 * | 5/2003 | ........... | G11B 5/4806 |
| KR | 100652429 B1 | 12/2006 | | |

OTHER PUBLICATIONS

Ohashi, Fumitake et al., Optimal design of smart carriage arm in magnetic disk drive for vibration suppression, Microsyst Technol (2005) 11: 711-717 / Accepted: Dec. 26, 2003 / Published online: Jul. 7, 2005, Springer-Verlag.

(Continued)

*Primary Examiner* — William J Klimowicz
(74) *Attorney, Agent, or Firm* — John D. Henkhaus

(57) ABSTRACT

A hard disk drive carriage arm includes a top depressed portion or indentation extending from a top surface toward a bottom surface and a bottom depressed portion or indentation extending from the bottom surface toward the top surface and opposing the top depressed portion. As such, a separating structure between the depressed portions partitions a corresponding balance hole, preferably at or near a mid-plane between the top and bottom surfaces. This configuration does not notably increase windage-based power loss while suppressing fluid force fluctuation, thereby stabilizing and balancing the airflow inside of the depressed portions.

20 Claims, 4 Drawing Sheets

(56) References Cited

U.S. PATENT DOCUMENTS

| | | | |
|---|---|---|---|
| 6,369,977 B1 | 4/2002 | Imai et al. | |
| 6,545,842 B2 * | 4/2003 | Rao | G11B 33/08 360/99.18 |
| 6,597,540 B2 * | 7/2003 | Tsuda | G11B 5/49 360/266 |
| 6,731,466 B2 * | 5/2004 | Arya | G11B 5/484 |
| 6,765,764 B1 * | 7/2004 | Misso | G11B 5/4813 29/603.03 |
| 6,879,467 B2 * | 4/2005 | Shimizu | G11B 5/4833 360/265.9 |
| 6,982,852 B2 | 1/2006 | Nagahiro et al. | |
| 7,136,261 B2 | 11/2006 | Bhattacharya et al. | |
| 7,522,385 B2 * | 4/2009 | Soga | G11B 33/08 360/266 |
| 7,636,222 B1 * | 12/2009 | Dobosz | G11B 5/5569 360/265.9 |
| 7,697,240 B2 | 4/2010 | Funabashi et al. | |
| 8,345,387 B1 * | 1/2013 | Nguyen | G11B 5/4833 360/265.9 |
| 8,913,346 B2 * | 12/2014 | Ikeji | G11B 5/4833 360/244.8 |
| 9,153,261 B1 * | 10/2015 | Kerner | G11B 5/4806 |
| 11,341,997 B2 * | 5/2022 | Tokizaki | G11B 5/4813 |
| 11,348,607 B1 * | 5/2022 | Keshavan | G11B 5/4826 |
| 2002/0097525 A1 * | 7/2002 | Rao | G11B 33/08 |
| 2004/0174639 A1 | 9/2004 | Asano et al. | |
| 2005/0141135 A1 * | 6/2005 | Soga | G11B 33/08 |
| 2006/0209456 A1 * | 9/2006 | Bisuwasu | G11B 5/5526 |
| 2008/0037178 A1 * | 2/2008 | Nguyen | G11B 5/4833 360/265.7 |
| 2011/0211280 A1 * | 9/2011 | Chen | G11B 5/4833 |

OTHER PUBLICATIONS

Koganezawa, Shinji et al., Linear protrusion structure on carriage-arm surface for reduction of flow-induced carriage vibration in hard disk drives, Microsyst Technol (2011) 17:799-804 / Accepted: Jan. 28, 2011 / Published online: Feb. 17, 2011, Springer-Verlag.

Yasutaka, Sasaki et al., Dual-Stage Actuator for HDD Achieving High-Accuracy Positioning and Wide-Bandwidth Servo Control, Toshiba Review, vol. 66 No.11 (2011), downloaded at https://toshiba.semicon-storage.com/content/dam/toshiba-ss-v2/master/en/storage/technology-center/ToshibaReview_vol66n11.pdf.

* cited by examiner

FOR A CARRIAGE PART COMPRISING A PLURALITY OF ARMS EXTENDING FROM A MAIN BODY, FOR ONE OR MORE OF THE ARMS:

FORM A TOP DEPRESSED PORTION EXTENDING FROM A TOP SURFACE OF THE ARM TOWARD A BOTTOM SURFACE OF THE ARM
402

FORM A BOTTOM DEPRESSED PORTION EXTENDING FROM THE BOTTOM SURFACE TOWARD THE TOP SURFACE AND OPPOSING THE TOP DEPRESSED PORTION, SUCH THAT THE TOP AND BOTTOM DEPRESSED PORTIONS MEET AT OR NEAR A MID-PLANE BETWEEN THE TOP AND BOTTOM SURFACES
404

FIG. 4

HARD DISK DRIVE CARRIAGE ARM DEPRESSION

FIELD OF EMBODIMENTS

Embodiments of the invention may relate generally to data storage devices, and particularly to approaches to a carriage arm for a hard disk drive.

BACKGROUND

A hard disk drive (HDD) is an electronic non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

A typical HDD includes a carriage mounted on a pivot shaft with an interposed pivot bearing assembly. A voice coil of a voice coil motor (VCM) is attached to one side of the carriage and a plurality arms extend from the carriage in a direction opposing the VCM, and to each of which a suspension and head-gimbal assembly (HGA) are attached. The VCM is configured to move the arms and the corresponding HGAs to access portions of a corresponding magnetic-recording disk medium. One important parameter that bears close scrutiny with respect to HDDs is power consumption. Furthermore, one major contributor to the overall power consumption of HDDs is the drag (i.e., the resistance to motion through a fluid) of the foregoing arms. These arms are also commonly referred to as carriage arms, actuator arms, and suspension arms.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4 is a flow diagram illustrating a method of manufacturing a hard disk drive carriage arm, according to an embodiment.

DETAILED DESCRIPTION

Figure 1:
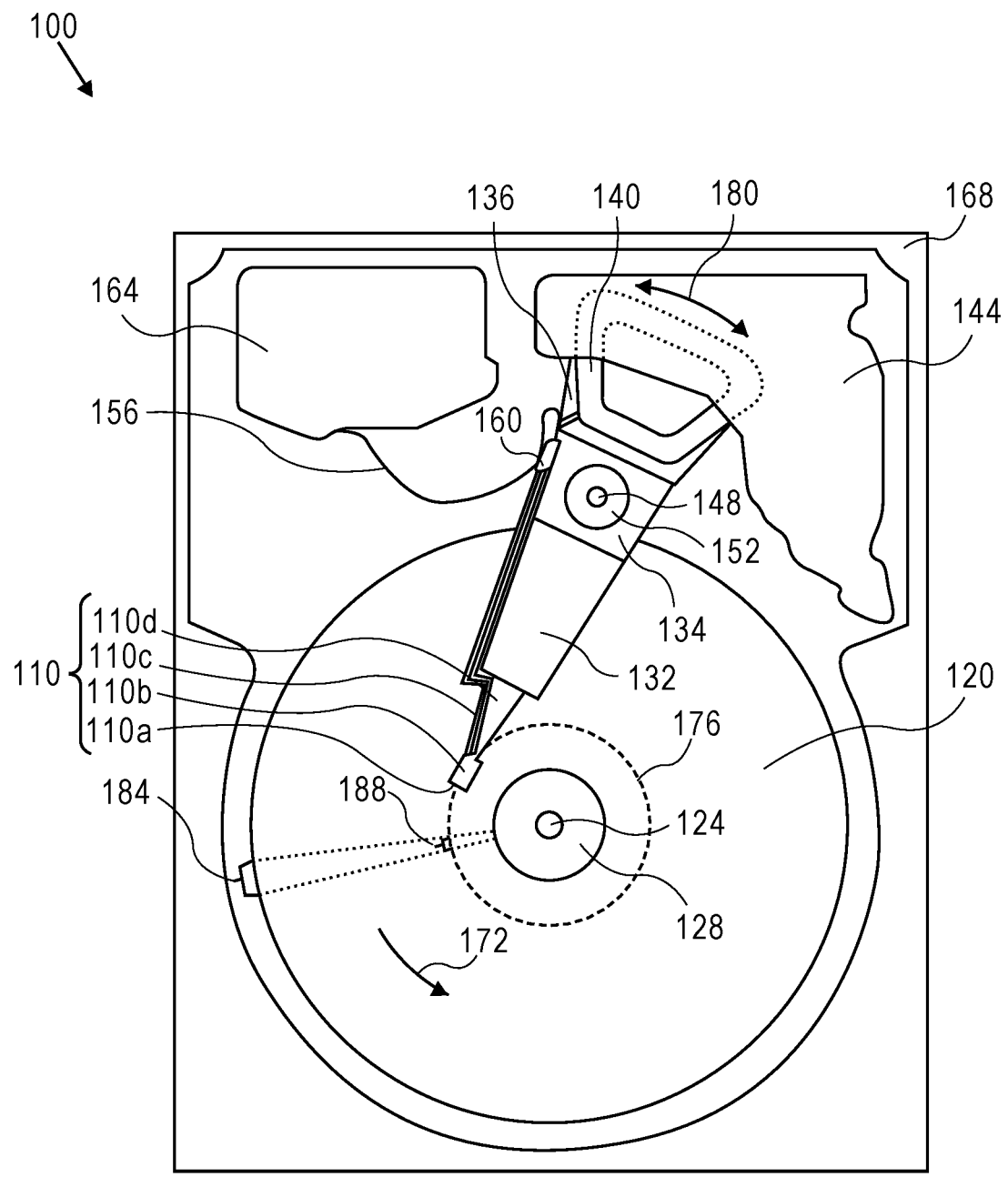
FIG. 1 is a plan view illustrating a hard disk drive (HDD), according to an embodiment.

Approaches to a carriage arm for reducing power consumption, such as for a hard disk drive (HDD), are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that in these days of massive data storage an important parameter associated with an HDD is its power consumption, and that one major contributor to the overall power consumption of an HDD is the drag of the carriage/actuator arms (hereinafter, "carriage arm(s)" or simply "arm(s)"). Furthermore, as the number of disk media in HDDs grows in evolution, the cumulative drag of the carriage arms increases accordingly. Two components of drag are known to contribute to the overall arm drag: pressure drag and viscous drag. Pressure drag depends on the basic shape and blockage factor, where lightening (or balancing) holes in the arms tend to create additional stagnation pressure that increases pressure drag. Viscous drag refers to surface friction drag that depends of the shear force(s) over the arm surfaces. Because of the effect the carriage arms have on HDD power consumption via the drag they present, there is a desire to lower the overall arm drag to benefit the total cost of ownership of an HDD.

Carriage Arm Having Depression

Study has shown that carriage arm design conflicts are present between windage-based power loss ("windage loss", where windage generally refers to the retarding force of air friction on a moving object) reduction and fluid force fluctuation suppression. For example, fluid force fluctuation on a carriage arm reduces when balance hole(s) are covered or filled, e.g., by reducing the alternate vortex in the balance hole(s). However, covering or filling any balance holes results in larger windage loss. Furthermore, in the case of a carriage arm design in which one side of a balance hole is covered, the covering damper is beneficial in attenuating some arm mode resonances. However, such a design creates a shear-driven effect which creates an undesirable, asymmetrical flow pattern across the width of the arm. Still further, carriage arm vibration characteristics are also important to HDD performance, so it is considered preferable to retain the basic dimensions of the carriage arm, such as its thickness and width as well as the balance hole lightening portion(s).

Figure 2A:
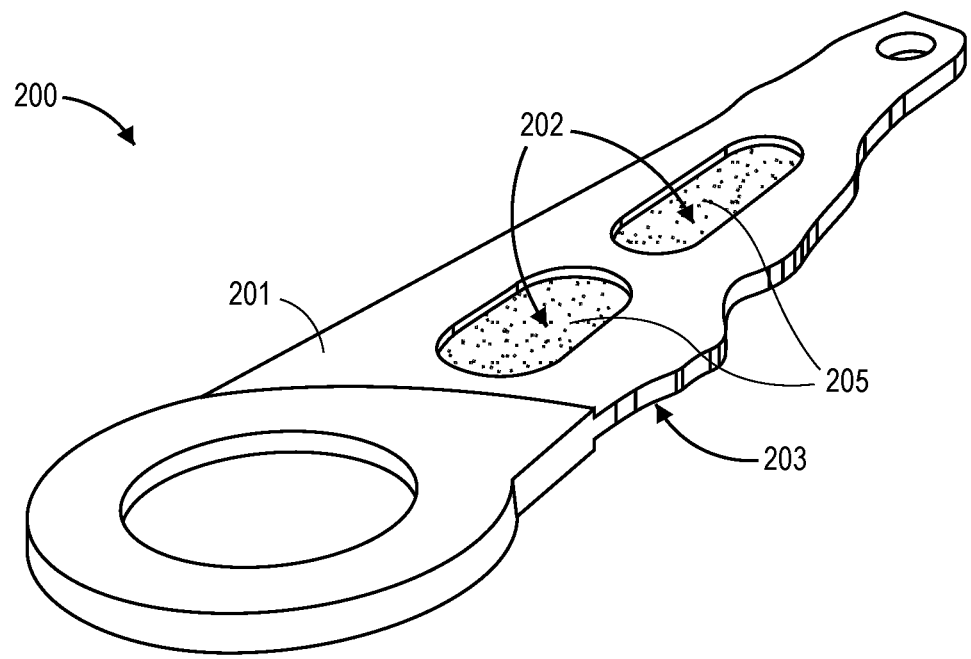
FIG. 2A is a perspective view illustrating an HDD carriage arm, according to an embodiment.
Figure 2B:
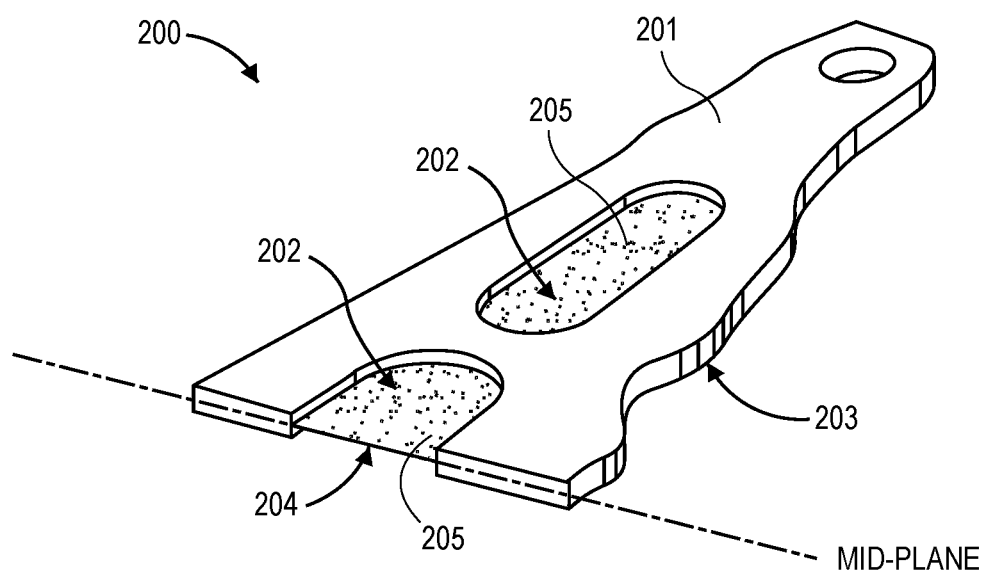
FIG. 2B is a cross-sectional view illustrating the carriage arm of FIG. 2A, according to an embodiment.

FIG. 2A is a perspective view illustrating an HDD carriage arm, and FIG. 2B is a cross-sectional view illustrating the carriage arm of FIG. 2A, both according to an embodiment. Carriage arm 200 comprises a top surface 201 and a bottom surface 203 and, according to an embodiment, a top depressed portion 202 (may also be referred to as a "recess" or "indented portion" or envisioned as basin-like) extending from the top surface 201 toward the bottom surface 203 and an opposing bottom depressed portion 204 (may also be referred to as a "recess" or "indented portion" or envisioned as basin-like) extending from the bottom surface 203 toward the top surface 201. As depicted in FIG. 2B and according to an embodiment, the top and bottom depressed portions 202, 204 meet at a substantially mid-plane between the top and bottom surfaces 201, 203. Hence, according to an embodiment the carriage arm 200 further comprises a separating structure 205 between the top and bottom depressed portions 202, 204 and forming a bottom surface of the top depressed portion 202 and a top surface of the bottom depressed portion 204. The top and bottom depressed portions 202, 204 and corresponding separating structure 205 are depicted in textured form in FIGS. 2A-2B not to imply that they are composed of a different material than top and bottom surfaces 201, 203 but to make visually clear that such features are depressed portions rather than complete through-holes.

Notably, modeling and analysis of the top and bottom depressed portions 202, 204 has shown that windage loss does not increase, based at least in part by maintaining the distance between arm 200 and a corresponding disk medium (e.g., less lift bias than with one side of a balancing hole covered), and that the fluid force fluctuation is in part suppressed by partitioning the balance hole via the separating structure 205 material, thereby stabilizing and balancing the airflow inside of the top and bottom depressed portions 202, 204 as contrasted with the prior balancing through-hole (s). Furthermore, arm vibration characteristics are maintained because the basic dimensions of arm 200 are maintained, along with the balancing hole(s) and positioning thereof. Still further, the same foregoing effects would be expected in lighter-than-air (e.g., helium, etc.) gas-filled HDDs as in air-filled HDDs.

According to an embodiment, the separating structure 205 comprises a top etched surface etched down from the top surface 201 of the carriage arm 200 (e.g., half-etched) and a bottom etched surface etched up from the bottom surface 203 of the carriage arm 200 (e.g., half-etched). Hence, carriage arm 200 may be manufactured with or as a single material part. Note that the number of, the area of, the positioning of the top and bottom depressed portions 202, 204 may vary from implementation to implementation based on the various known design goals corresponding to a given carriage arm, e.g., inertia, drag characteristics, vibration characteristics, operational shock characteristics, and the like. For example, only one balance hole may be "replaced" with the described top and bottom depressed portions 202, 204, such as the balance hole causing the most excitation via the aforementioned alternate vortex (e.g., the top and bottom depressed portions 202, 204 farthest from the carriage pivot, found to be the source of alternate vortex), while the accompanying balance hole is maintained as a lightening through-hole. In contrast, carriage arm 200 may comprise a plurality of top and bottom depressed portions 202, 204, such as depicted in FIG. 2A. For another example and considered within the inventive scope, a longer balance hole (e.g., like a single balance hole effectively combining the two depicted) is considered, where only a portion of such a balance hole includes a depressed portion and another portion of the same balance hole is maintained as a lightening through-hole.

Figure 3A:
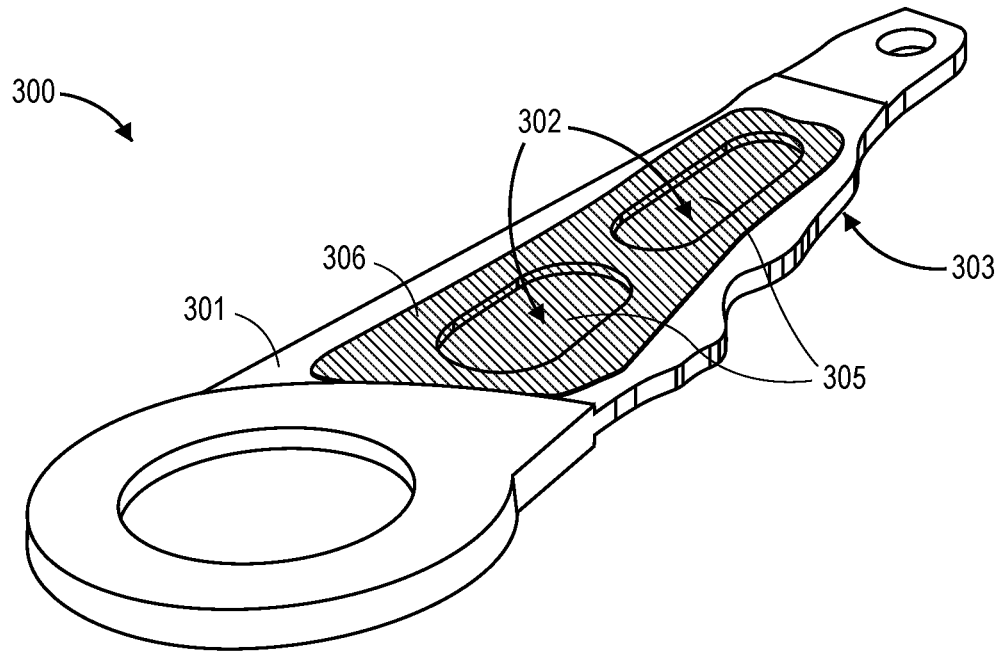
FIG. 3A is a perspective view illustrating an HDD carriage arm, according to an embodiment.
Figure 3B:
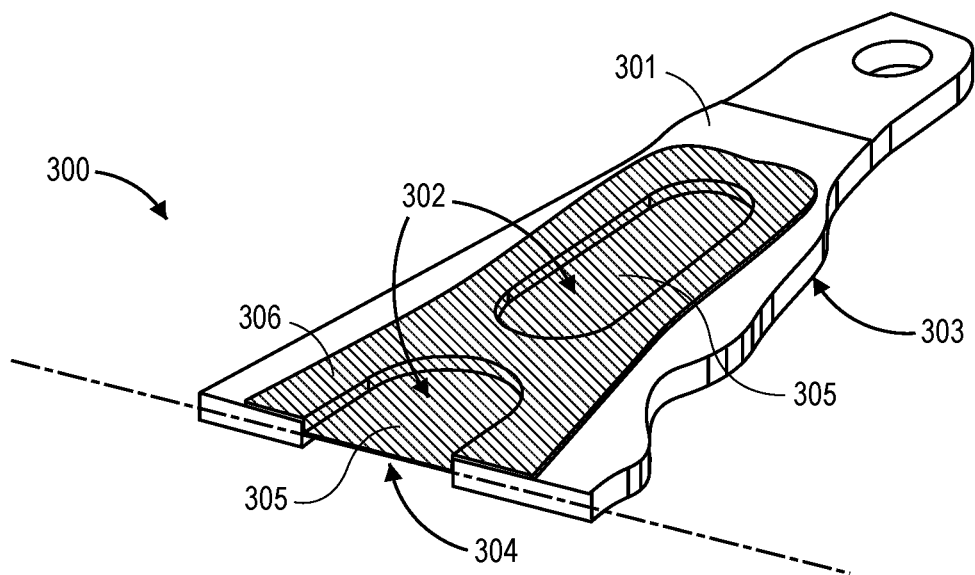
FIG. 3B is a cross-sectional view illustrating the carriage arm of FIG. 3A, according to an embodiment.

FIG. 3A is a perspective view illustrating an HDD carriage arm, and FIG. 3B is a cross-sectional view illustrating the carriage arm of FIG. 3A, both according to an embodiment. As with carriage arm 200 of FIGS. 2A-2B, carriage arm 300 comprises a top surface 301 and a bottom surface 303 and a top depressed portion 302 (may also be referred to as a "recess" or "indented portion" or envisioned as basin-like) extending from the top surface 301 toward the bottom surface 303 and an opposing bottom depressed portion 304 (may also be referred to as a "recess" or "indented portion" or envisioned as basin-like) extending from the bottom surface 303 toward the top surface 301. As depicted in FIG. 3B and according to an embodiment, the top and bottom depressed portions 302, 304 meet at a substantially mid-plane between the top and bottom surfaces 301, 303. Hence, according to an embodiment the carriage arm 300 further comprises a separating structure 305 between the top and bottom depressed portions 302, 304 and forming a bottom surface of the top depressed portion 302 and a top surface of the bottom depressed portion 304. The aforementioned modeling and analysis of the top and bottom depressed portions 202, 204 (FIGS. 2A-2B) has shown equivalently applicable to the top and bottom depressed portions 302, 304 here.

According to an embodiment, the separating structure 305 comprises a damper material 306 adhered to the top surface 301 (or bottom surface 303) of the carriage arm 300 and extending into a lightening/balancing hole through the carriage arm 300. For example, the damper material 306 may be composed of metal (e.g., stainless steel, such as SS304) with a viscoelastic adhesive (VEA) (e.g., a pressure-sensitive adhesive, or "PSA"), a common form of damper in an HDD carriage arm context. However, the material used to form the separating structure 305 may vary from implementation to implementation, as the presence of one or more of the top depressed portion 302 and an opposing bottom depressed portion 304 is of primary concern. For non-limiting examples, the separating structure 305 can be made of any material(s) in conjunction with any adhesive, e.g. plastic, aluminum, etc., and does not have to be composed of a damping material. According to an embodiment, carriage arm 300 may comprise both a top damper material 306 forming top depressed portion 302 and a similar bottom damper material 306 forming the opposing bottom depressed portion 304, such as if a symmetrical arm/damper cross-section is desired, e.g., for vibrational control purposes. Here again the number of, the area of, the positioning of the top and bottom depressed portions 302, 304 may vary from implementation to implementation based on the various known design goals corresponding to a given carriage arm, e.g., inertia, drag characteristics, vibration characteristics, operational shock characteristics, and the like. For example, only one balance hole may be modified into a depression, indentation, recession with the described top and bottom depressed portions 302, 304, such as the balance hole causing the most excitation via the aforementioned alternate vortex (e.g., the top and bottom depressed portions 302, 304 farthest from the carriage pivot, found to be the source of alternate vortex). In contrast, carriage arm 300 may comprise a plurality of top and bottom depressed portions 302, 304, such as depicted in FIG. 3A.

Method of Manufacturing a Hard Disk Drive Carriage Arm

FIG. 4 is a flow diagram illustrating a method of manufacturing a hard disk drive carriage arm, according to an embodiment. The method of FIG. 4 is described in the context of a carriage part (e.g., carriage 134 of FIG. 1) comprising a plurality of arms (e.g., arm 132 of FIG. 1) extending from a main body, i.e., the main pivot portion providing the axis of rotation about a corresponding pivot shaft (e.g., pivot shaft 148 of FIG. 1).

At block 402, for one or more of the arms, form a top depressed portion extending from a top surface of the arm toward a bottom surface of the arm. For example, top depressed portion 202, 302, by etching (FIGS. 2A-2B) or by damper material (FIGS. 3A-3B), is formed in corresponding carriage arm 200, 300 (FIGS. 2A-3B).

At block 404, form a bottom depressed portion extending from the bottom surface toward the top surface and opposing the top depressed portion. For example, bottom depressed portion 204, 304, by etching (FIGS. 2A-2B) or by damper material (FIGS. 3A-3B), is formed in corresponding carriage arm 200, 300 (FIGS. 2A-3B).

Note that for etched depressed portion(s) 202, 204, it is considered acceptable to include a chamfer or a radius at the corner edges of the etched areas (e.g., where top and/or bottom surfaces 201, 203 meet the sides of the corresponding top and/or bottom depressed portions 202, 204), as well as to include taper(s) as the inside sides of the etched areas. Similarly, for damper material depressed portion(s) 302, 304, it is considered acceptable to include a chamfer or a radius at the corner edges (e.g., where top and/or bottom surfaces 201, 203 meet the sides of the corresponding top and/or bottom depressed portions 202, 204). Further, while full contact between the balance hole side surface and damper material 305 is preferred, it is considered acceptable to have some gap and/or taper between the carriage arm 300 balance hole side surface and the damper material 305.

Physical Description of an Illustrative Operating Context

Embodiments may be used in the context of a data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm or carriage arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "motor base assembly" or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive comprising:
a plurality of disk media rotatably mounted on a spindle;
a head slider comprising a read-write head configured to write to and to read from a disk medium of the plurality of disk media;
a rotary actuator configured to move the head slider to access portions of the disk medium;
a carriage coupled with the rotary actuator, the carriage comprising at least one arm extending therefrom, wherein the at least one arm comprises:
an outer leading edge facing the disk media and an outer trailing edge facing away from the disk media,
an uppermost top surface extending between the outer leading and trailing edges and an opposing lowermost bottom surface extending between the outer leading and trailing edges,
a top depressed portion comprising an enclosing sidewall extending from the top surface toward the bottom surface and terminating at a separating structure, and
a bottom depressed portion opposing the top depressed portion and comprising an enclosing sidewall extending from the bottom surface toward the top surface and terminating at the separating structure.

2. The hard disk drive of claim 1, wherein the top and bottom depressed portions meet substantially at a mid-plane between the top and bottom surfaces.

3. The hard disk drive of claim 1, wherein the separating structure forms a bottom surface of the top depressed portion and a top surface of the bottom depressed portion.

4. The hard disk drive of claim 1, wherein the separating structure comprises a top etched surface etched from the top surface of the arm and a bottom etched surface etched from the bottom surface of the arm.

5. The hard disk drive of claim 1, wherein the separating structure comprises a material adhered to the top or bottom surface of the arm and extending into a lightening hole through the at least one arm.

6. The hard disk drive of claim 1, wherein the arm comprises a plurality of top and bottom depressed portions.

7. A hard disk drive carriage arm comprising:
an outer leading edge and an outer trailing edge;
an uppermost top surface extending between the outer leading and trailing edges;
an opposing lowermost bottom surface extending between the outer leading and trailing edges;
a top depressed portion comprising an enclosing sidewall extending from the top surface toward the bottom surface and terminating at a separating structure; and
a bottom depressed portion opposing the top depressed portion and comprising an enclosing sidewall extending from the bottom surface toward the top surface and terminating at the separating structure.

8. The carriage arm of claim 7, wherein the top and bottom depressed portions meet substantially at a mid-plane between the top and bottom surfaces.

9. The carriage arm of claim 7, wherein the separating structure between the top and bottom depressed portions forms a bottom surface of the top depressed portion and a top surface of the bottom depressed portion.

10. The carriage arm of claim 7, wherein the separating structure comprises a top etched surface etched from the top surface of the carriage arm and a bottom etched surface etched from the bottom surface of the carriage arm.

11. A hard disk drive comprising the carriage arm of claim 10.

12. The carriage arm of claim 7, wherein the separating structure comprises a material adhered to the top or bottom surface of the carriage arm and extending into a lightening hole through the carriage arm.

13. A hard disk drive comprising the carriage arm of claim 12.

14. The carriage arm of claim 7, further comprising a plurality of top and bottom depressed portions.

15. A method of manufacturing a carriage arm for a hard disk drive (HDD), the method comprising:
for a carriage part comprising a plurality of arms extending from a main body, for one or more of the arms:
forming an uppermost top surface extending between an outer leading edge and an outer trailing edge;
forming an opposing lowermost bottom surface extending between the outer leading and trailing edges;
forming a top depressed portion comprising an enclosing sidewall extending from the top surface of the arm toward the bottom surface of the arm and terminating at a separating structure; and
forming a bottom depressed portion opposing the top depressed portion and comprising an enclosing sidewall extending from the bottom surface toward the top surface and terminating at the separating structure.

16. The method of claim 15, wherein forming the top and bottom depressed portions includes forming the top and bottom depressed portions to meet at a substantially midplane between the top and bottom surfaces.

17. The method of claim 15, further comprising: forming the separating structure between the top and bottom depressed portions, to form a bottom surface of the top depressed portion and a top surface of the bottom depressed portion.

18. The method of claim 17, wherein forming the separating structure includes:
etching from the top surface of the arm to form a top etched surface of the separating structure; and
etching from the bottom surface of the arm to form a bottom etched surface of the separating structure.

19. The method of claim 17, wherein:
the arm further comprises a lightening hole therethrough; and
forming the separating structure includes adhering a material to the top or bottom surface of the arm and extending into the lightening hole.

20. The method of claim 15, further comprising:
forming a second top depressed portion comprising a second enclosing sidewall extending from the top surface toward the bottom surface and terminating at a second separating structure; and
forming a second bottom depressed portion opposing the second top depressed portion and comprising a second enclosing sidewall extending from the bottom surface toward the top surface and terminating at the second separating structure.

* * * * *